United States Patent
Reichenbach, Sr. et al.

(10) Patent No.: US 6,272,759 B1
(45) Date of Patent: Aug. 14, 2001

(54) SIDEFRAME WHEELBASE GAUGE

(75) Inventors: Terry L. Reichenbach, Sr., Sebring; Les L. Unger, Washingtonville; Terry L. Tilley, Salem, all of OH (US); Leonard D. Thomason, Collinsville, IL (US)

(73) Assignee: AMSTED Industries Incorporated, Chicago, IL (US)

( * ) Notice: Subject to any disclaimer, the term of this patent is extended or adjusted under 35 U.S.C. 154(b) by 0 days.

(21) Appl. No.: 09/289,879

(22) Filed: Apr. 12, 1999

(51) Int. Cl.⁷ ........................................ G01B 5/00
(52) U.S. Cl. ................. 33/203; 33/651; 33/783; 33/1 Q; 33/810
(58) Field of Search ............... 33/203.18, 203.2, 33/810, 1 Q, 338, 783, 806, 811, 613, 651, 203

(56) References Cited

U.S. PATENT DOCUMENTS

| | | | |
|---|---|---|---|
| 568,725 | * 10/1896 | Armstrong | 33/338 |
| 3,151,396 | * 10/1964 | Junkins | 33/203.2 |
| 3,305,936 | * 2/1967 | Dent | 33/203 |
| 3,807,049 | * 4/1974 | Zajac | 33/165 |
| 4,064,632 | * 12/1977 | Waldecker | 33/203.19 |
| 5,694,697 | * 12/1997 | Curtis | 33/203 |

FOREIGN PATENT DOCUMENTS

| | | | |
|---|---|---|---|
| 584761 | * 10/1959 | (CA) | 33/338 |
| 1263914 | * 12/1989 | (CA) | 33/203.18 |

* cited by examiner

Primary Examiner—Diego Gutierrez
Assistant Examiner—Lydia M. De Jesús
(74) Attorney, Agent, or Firm—Edward J. Brosius

(57) ABSTRACT

A gauge is provided that is useful in measuring the horizontal wheelbase of a railway freight car truck sideframe. The gauge itself is comprised of a main horizontal body section usually of a single piece of aluminum bar stock. A stationary depending leg extends downwardly and is affixed to near one end of the main horizontal body section. A bearing slide assembly is affixed to the main horizontal body section near its other end. A measuring leg depends from the bearing slide assembly and is movable along the bearing slide assembly. An indicator scale is associated with the measuring leg so that its relative position with regard to the main horizontal body can be readily measured from a scale affixed thereon. The stationary depending leg is brought into contact with one edge of a pedestal jaw of the railway freight car sideframe, and the measuring leg is moved into contact along the bearing slide assembly with an opposite edge of the opposite pedestal jaw. A measurement reading of the wheelbase of a sideframe is then made.

16 Claims, 5 Drawing Sheets

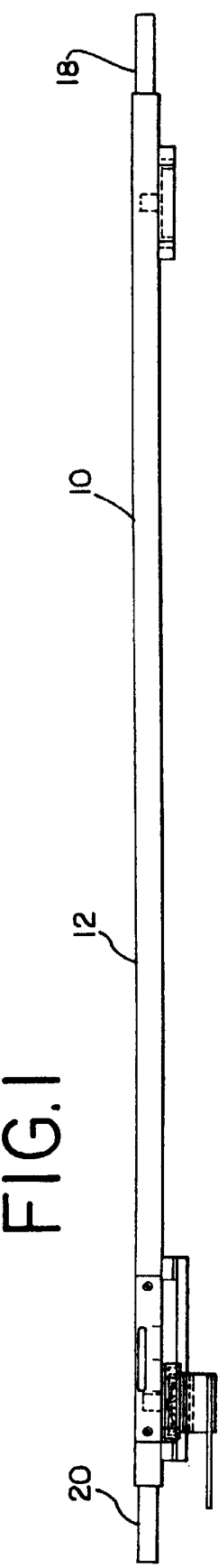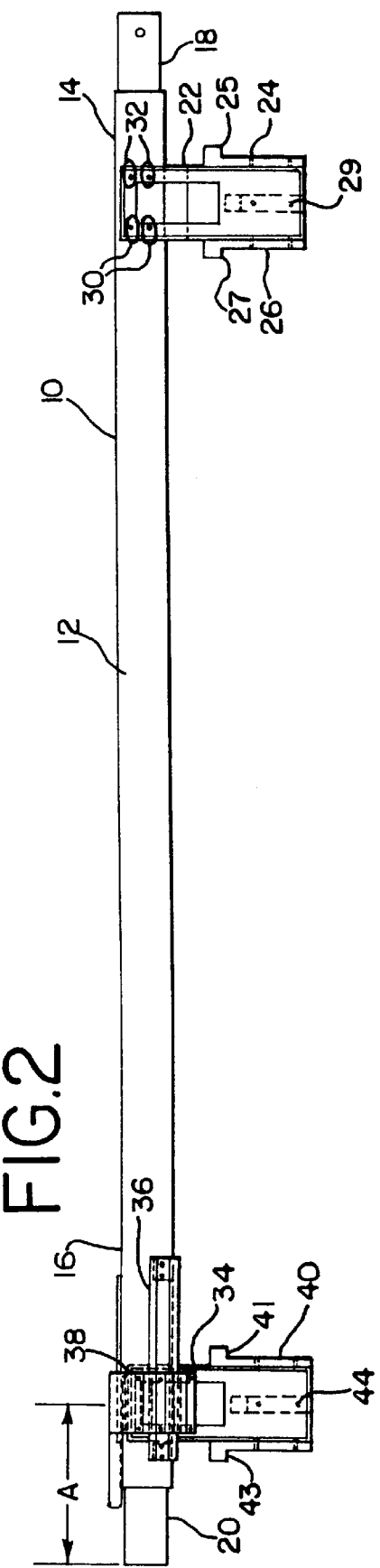

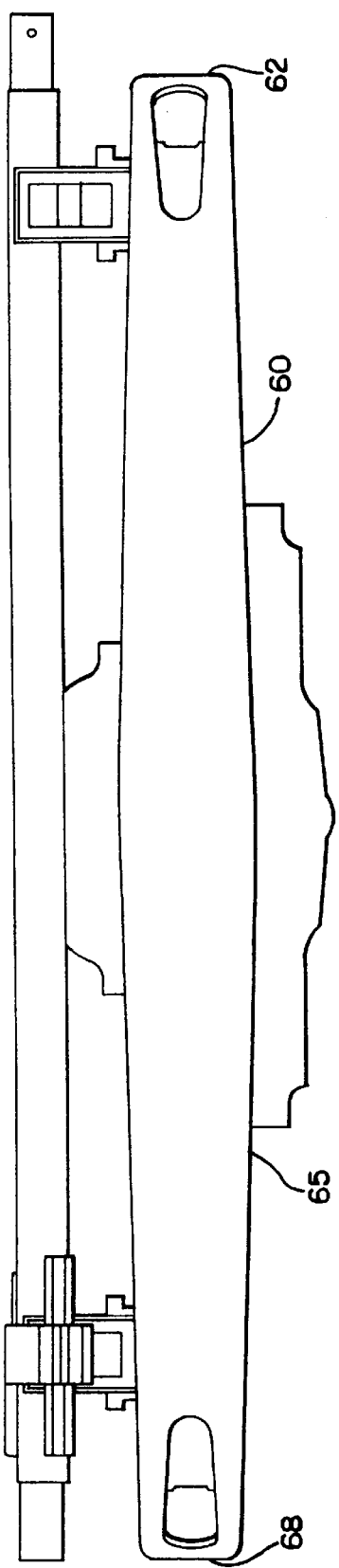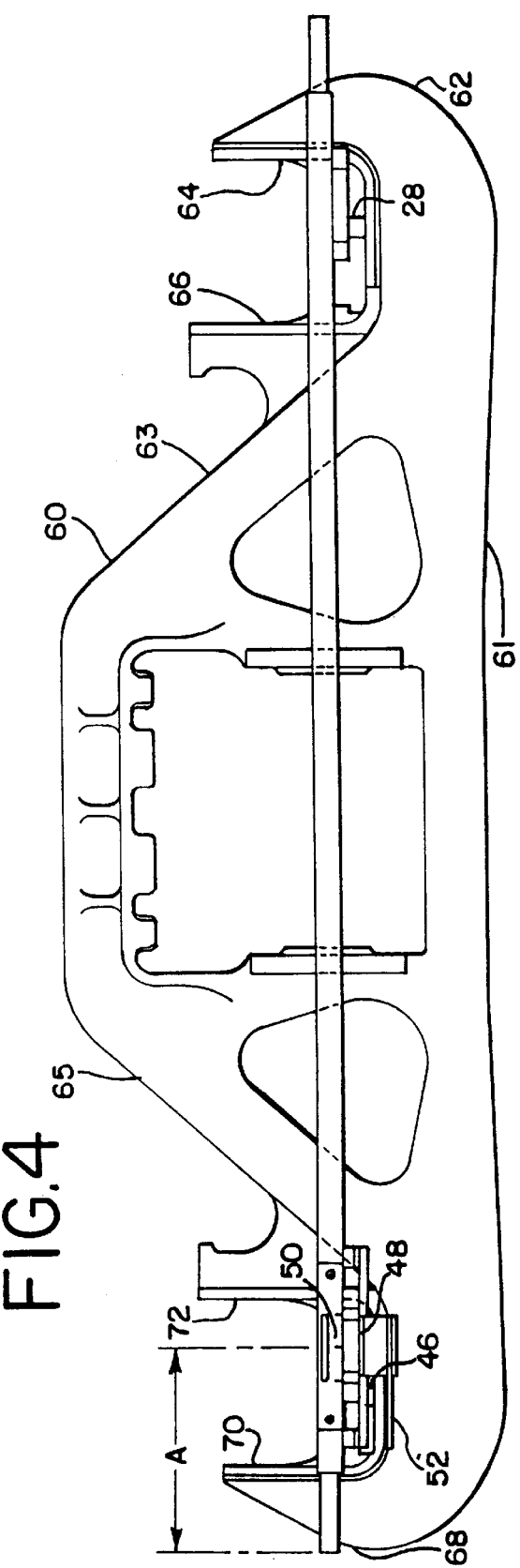
FIG.3
FIG.4

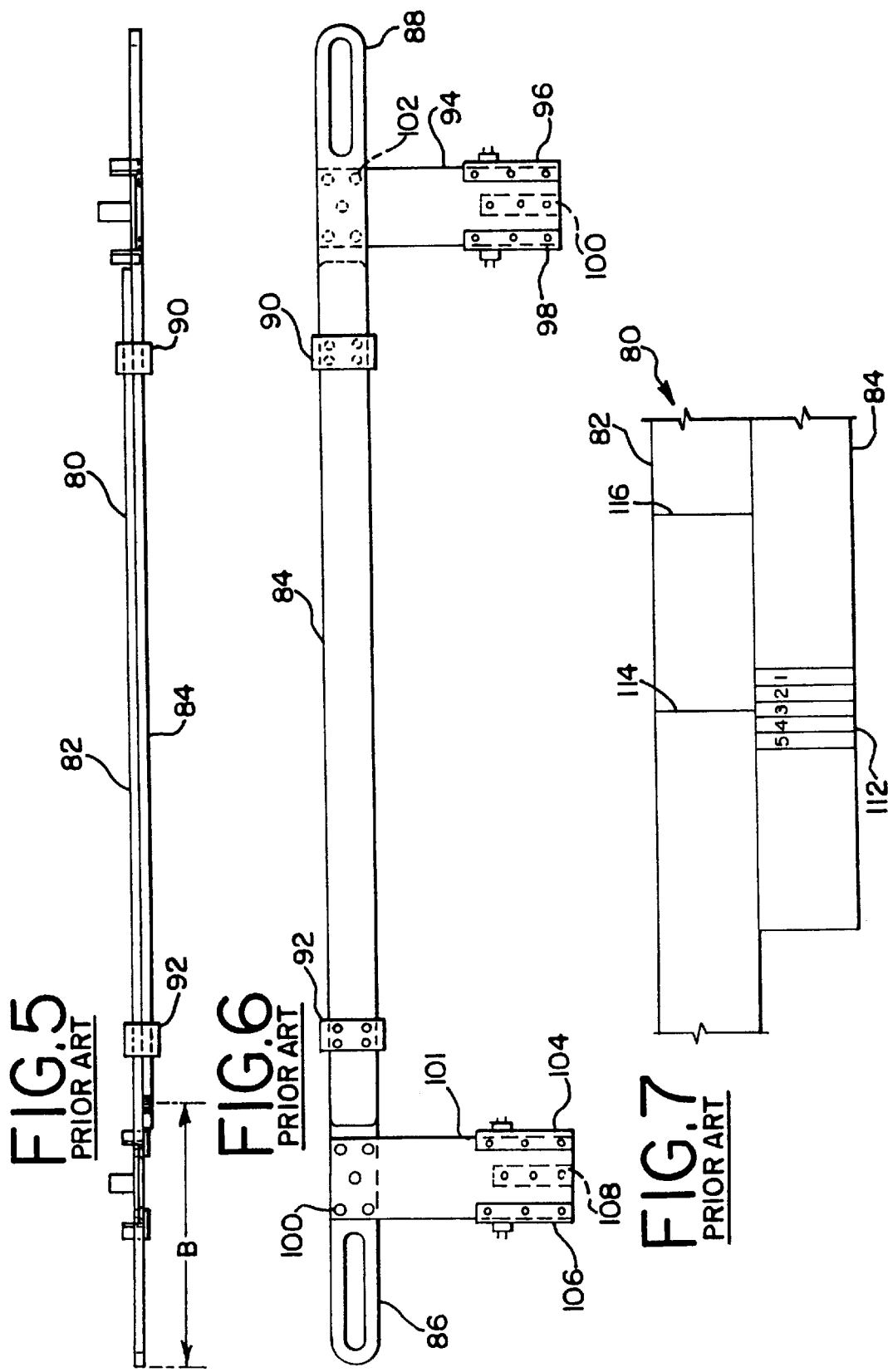

SIDEFRAME WHEELBASE GAUGE

BACKGROUND OF THE INVENTION

The present invention provides a gauge for measuring a horizontal dimension and more particularly, a gauge useful in measuring the wheelbase of a cast steel railway freight car sideframe.

The traditional three-piece railway freight car truck is comprised of two cast steel sideframes that are identical in design and are aligned parallel with the railway track. A bolster opening is located at a central portion of each sideframe to receive a spring group upon which a cast steel bolster is supported. Thusly, a three piece railway freight car truck is comprised of three major structural components, the two sideframes and the transversely mounted bolster. Each sideframe also includes pedestal jaws near each end thereof for receipt of a roller bearing assembly and, in turn, the end of a railway freight car axle. The wheels of such axle are mounted laterally inboard from the sideframe.

It is desirable in assembling the three-piece railway freight car truck to have the axles as parallel as possible to assist in steering and to improve other performance characteristics of the railway freight car truck. Accordingly, it is desirable to utilize two sideframes that have as nearly as possible the same wheelbase such that the axles when received in the pedestal jaws of the opposite sideframes are nearly as parallel as possible. Wheelbase is of course the horizontal spacing between the pedestal jaws of each sideframe.

A prior art wheelbase gauge is known and in use in certain foundries that produce cast steel sideframes. Such wheelbase gauge is comprised of two elongated aluminum rectangular bar stock sections joined by two sliding fit support braces. Each support brace is located about one quarter the length of the entire wheelbase gauge inward from each end of the wheelbase gauge. In use, such wheelbase gauge is usually placed on a railway freight car sideframe that is lying on its side on an appropriate holding table. Such prior art wheelbase gauge includes depending legs that are affixed near either end of the gauge and extend downwardly therefrom. In placing such prior art gauge on a cast steel sideframe, each depending leg is placed into one of the pedestal jaws of the sideframe and the two main sections of the gauge are moved relative to each other such that a horizontally outboard edge of one leg and a horizontally inboard edge of another leg contact respective edges of the pedestal jaw. The gauge is then moved horizontally such that the other edges of the depending legs contact the other edges of the pedestal jaw. Readings are made from each of the two contact positions and averaged to come up with the wheelbase for the sideframe.

It is known that errors can occur due to the difficulty in the relative sliding of each component main section of the wheelbase gauge for there is the possibility of bending under horizontal force applied by the two workers who must position the gauge on the sideframe. One worker must pull the respective end of the gauge and the other worker must push the respective end of the gauge in order to contact the edges of the sideframe pedestal jaws. The process is then repeated in reverse wherein the first worker is pushing his end of the gauge into contact with an inboard end of the pedestal jaw whereas the other worker is pulling his end of the gauge into contact with an outboard edge of the pedestal jaw. Adding to the difficulty was the weight of this wheelbase gauge, about 85 lbs.

A first measurement reading was taken by comparing indicator lines etched in the top of one section of the main gauge body with a reference line on the top of the other section of the main gauge body for a standard size of sideframe thereby determining if the wheelbase was exact or slightly oversized or slightly undersized. An indication was then provided on each sideframe by leaving an appropriate number of protruding dots to indicate whether the sideframe was slightly oversized or undersized from the standard wheelbase. Similarly sized sideframes would be assembled in the same freight car truck. Further details and description of the prior art wheelbase gauge will be provided in the detailed description.

SUMMARY OF THE INVENTION

It is an object of the present invention to provide an improved wheelbase gauge to be utilized in measuring the horizontal wheelbase of a railway freight car sideframe.

It is another object of the present invention to provide an improved wheelbase gauge for use in measuring the horizontal wheelbase of a railway freight car sideframe, wherein such gauge is readily applied, easy to handle and easily readable.

The improved wheelbase gauge of the present invention is comprised of a main body section that is aluminum rectangular tubing with solid aluminum handles on the ends. Other lightweight metals such as titanium could be used, but for cost reasons aluminum is preferred. The main horizontal body section of aluminum tubing is about eight feet long, with a stationary leg affixed to and depending from near one end of the main horizontal body section. A bearing slide assembly is affixed near the other end of the horizontal main body section. Such bearing slide assembly is generally comprised of two steel bearing slides affixed to the main horizontal body section, with each bearing slide extending horizontally. A measuring leg is affixed to the bearing slides such that it is moveable horizontally along such bearing slides. The measuring leg also depends downwardly from the bearing slides in a manner similar to the stationary leg.

In operation, the wheelbase gauge is placed on a sideframe that is resting on its side, usually with the cope surface of the sideframe one piece steel casting facing upwardly to receive the wheelbase gauge. The stationary leg is placed into contact with an outboard edge of a pedestal jaw at one end of the sideframe. With the operator holding the wheelbase gauge into such contact at one end of the sideframe, the operator of the other end of the wheelbase gauge gently pushes the measuring leg along the bearing slide assembly into contact with the inboard edge of the other pedestal jaw of a sideframe. A reading is taken from an indicating scale that is located on the measuring leg relative to a standard wheelbase represented by a line etched in the surface of the main horizontal body section.

The operator at the stationary leg end of the wheelbase gauge then pushes the wheelbase gauge such that the stationary leg is in contact with the inboard edge of the first pedestal jaw. The operator at the other end of the wheelbase gauge would then gently pull the measuring leg along the bearing slide assembly into contact with the outboard edge of the other pedestal jaw edge. A reading would then be taken from the measuring scale. The first reading and the second reading are then averaged to establish the wheelbase of the sideframe. The measured wheelbase is permanently marked on the sideframe by leaving an appropriate number of protruding buttons to indicate whether the sideframe was slightly oversized or undersized from the standard wheelbase. Similarly marked and sized sideframes are paired in an assembled three piece railway freight car truck.

BRIEF DESCRIPTION OF THE DRAWINGS

In the drawings,

FIG. 1 is a top view of a wheelbase sideframe gauge in accordance with the present invention;

FIG. 2 is a side view of a wheelbase sideframe gauge in accordance with the present invention;

FIG. 3 is a side view of a wheelbase sideframe gauge being utilized to measure the wheelbase of a sideframe;

FIG. 4 is a top view of a wheelbase sideframe gauge being used to measure the wheelbase of a sideframe;

FIG. 5 is a top view of a prior art wheelbase sideframe gauge;

FIG. 6 is a side view of a prior art wheelbase sideframe gauge;

FIG. 7 is a top partial view in detail of the measuring scale of a prior art wheelbase sideframe gauge;

DETAILED DESCRIPTION OF THE INVENTION

Figure 8:
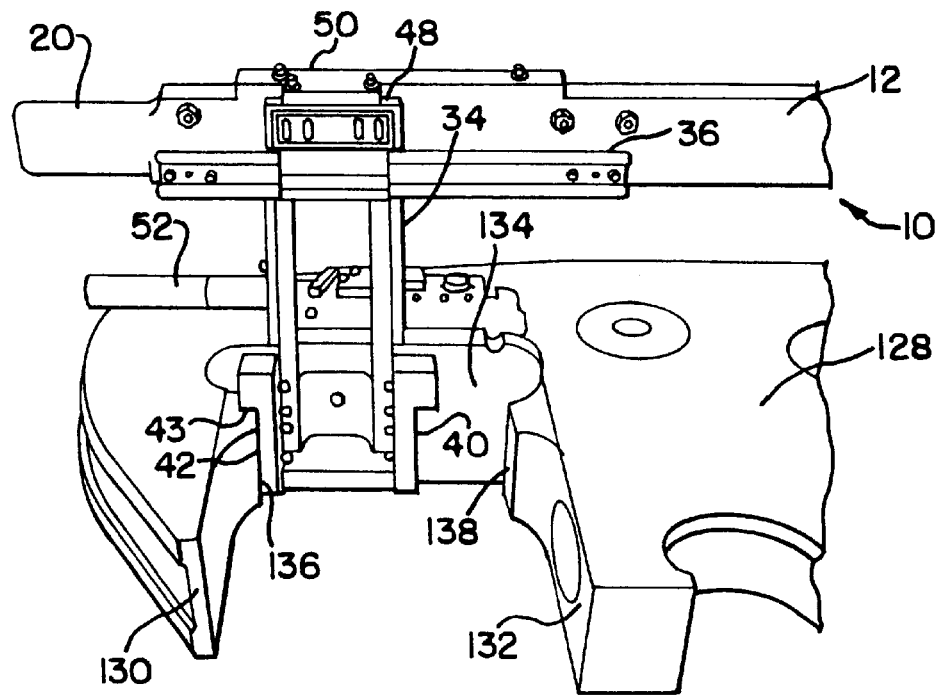
FIG. 8 is a partial view of the measuring leg and bearing slide assembly of the present invention being utilized and applied to the pedestal jaw area of a sideframe.

Referring now to FIGS. 1–4 of the drawings, a wheelbase gauge in accordance with the present invention is shown generally at 10. Wheelbase gauge 10 is comprised of wheelbase gauge main horizontal body section 12 which usually is a single metal bar stock of approximately 8 feet in length, about 2 inches in width and 4 inches in height. Aluminum is the preferred metal of construction due to its lightweight and strength, but other more exotic lightweight metal such as titanium may be utilized. It also would be possible to use a hollow aluminum or steel tube structure, or a traditional standard arrangement such as an I-beam configuration.

Stationary leg end 14 is referenced and is seen to terminate with a reduced width and height end handle 18 to make the handling of wheelbase gauge 10 by two operators easier with one operator being able to pick up and carry the gauge utilizing stationary end handle 18. The total weight of wheelbase gauge 10 is in the neighborhood of 40 lbs.–45 lbs. Stationary leg is usually formed of steel or other hardened metal and is affixed by stationary leg mounting bolts 30 to slots 32 in main horizontal body section 12. Mounting bolts 30 allow stationary leg 22 to be adjusted in its horizontal connected position to main horizontal body section 12.

It can be seen that stationary leg 22 depends downwardly from stationary leg end 14 of main horizontal body section 12, and is about 12 inches in length and about 5 inches in width. Outboard contact surface 24 is affixed to the outboard surface of stationary leg 22, and inboard contact surface 26 is affixed to the inboard edge of stationary leg 22. Such contact surfaces 24 and 26 are identical in construction and are usually comprised of hardened steel as such surfaces come in contact with the cast steel sideframe being measured. It is further seen that contact surfaces 24 and 26 include a top indented section shown at 25 and 27, respectively, to ease the positioning of wheelbase gauge 10 onto sideframe 60 being measured. Spacing bar 28 of hardened steel is affixed with mounting bolts 29 to a back surface of stationary leg 22. Spacing bar 28 assures the uniform positioning of wheelbase gauge 10 in the pedestal jaw opening of sideframe 60.

It is also seen that wheelbase gauge main horizontal body section 12 at its opposite end includes measuring end handle 20 again of reduced width and height to aid the operator at that end in carrying and positioning wheelbase gauge 10. Bearing slide assembly 36 is affixed at measuring leg end 16 of wheelbase gauge main horizontal body section 12. Bearing slide assembly 36 is usually comprised of two horizontal bearing slides, usually made of steel, to support and enable measuring leg 34 to depend from and extend downwardly from bearing slide assembly 36. Bearing slide adapter 38 is affixed to measuring leg 34 and is adapted to allow measuring leg 34 to move horizontally along bearing slide assembly 36 and accordingly along a portion of the horizontal length of wheelbase gauge main horizontal body section 12. Measuring leg 34 is rather similar to stationary leg 22 in that it is about 12 inches long and about 5 inches wide and is usually comprised of a steel material. Measuring leg inboard contact surface 40 and measuring leg outboard contact surface 42 are affixed to the respective inboard and outboard edges of measuring leg 34 to aid in positioning measuring leg in the other pedestal jaw of sideframe 60. Again, it can be seen that projections 41 on measuring leg inboard contact surface 43 on measuring leg outboard contact surface aid in the uniform positioning of measuring leg 34 in the other pedestal jaw of sideframe 60. Further, measuring leg spacing bar 46 is affixed to the backside of measuring leg 34 by mounting bolts 44. Such measuring leg spacing bar 46 allows the uniform positioning of measuring leg 34 in the other pedestal jaw opening of sideframe 60.

Although to be described further in detail, indicator scale 48 is seen mounted at the top of measuring leg 34, and includes indications of horizontal distance. Further, indicator marks are formed in a metal piece affixed to the top of main horizontal body section 12 to indicate certain standard pedestal jaw wheelbases for standard sideframes 60. Handle 52 also extends in an outward direction from measuring leg bearing slide adapter 38 to allow the ready movement of measuring leg 34 along bearing slide assembly 36. An additional point with regard to the location of indicator scale 48 is that it is located a distance A from the end of measuring end handle 20. Distance A is typically about 1 foot. This relatively small distance allows a ready reading of the wheelbase from scale 48 by the operator at measuring leg 34 end of wheelbase gauge 10.

Sideframe 60 itself is a uniform cast steel structure comprised of a top compression member 61 and diagonal tension members 63 and 65. Sideframe 60 is usually in the neighborhood of 8 feet in length and includes a first pedestal jaw end 62 and a second pedestal jaw end 68. These pedestal jaw ends are mirror images of each other and form adapters to each receive a roller bearing assembly wherein the end of a wheel axle would be received in the pedestal jaw opening. First pedestal jaw end 62 includes outboard edge 64 and inboard edge 66. Likewise, second pedestal jaw end 62 includes outboard edge 70 and inboard edge Referring now to FIGS. 5 and 6, a prior art wheelbase gauge is shown generally at 80. Wheelbase gauge 80 is seen to be comprised of a first main section 82 and a second main section 84. Each of such main sections are seen to be comprised of generally elongated rectangular bar stock, usually of aluminum, and of a thickness of about one half inch and a height of about 3 inches and a length of about 5.5 feet. First main section 82 and second main section 84 are slideably joined by first main support 90 and second main support 92. Each of such main supports comprises a coupling type arrangement that receives both of main sections 82 and 84 of wheelbase gauge 80. It is seen that first main support 90 is bolted to first main section 82 and slideably receives second main section 84 therethrough. Second main support 92 is bolted to second main section 84 and slideably receives first main section 82 therethrough. First main section 82 terminates in handle 88 which is basically a slot formed near the end of first main section 82. Second main section 84 terminates in a second main section handle 88 which again is basically a slot formed near the end of second main section 84.

First stationary leg 101 is affixed by mounting bolts 110 to near an end of first main section 82. First stationary leg 101 depends downwardly from first main section 82 and is usually comprised of steel and is about 5 inches wide and extends downwardly about 1 foot. First stationary leg 101 also includes an inboard contact surface 104 and an outboard contact surface 106. Both such contact surfaces are usually comprised of hardened steel and are affixed usually by screwing or bolting into the appropriate inboard and outboard edges of first stationary leg 101. Further, spacing bar 108 is affixed to the rear of first stationary leg 101. Spacing bar 108 is usually comprised of hardened steel and is about 5 inches long and about 1 inch in height and width. Inboard contact surface 104 and outboard contact surface 106 are also in the neighborhood of 6 inches long and about 1 in width and in height.

Second stationary leg 94 is similar to first stationary leg 101 except that second stationary leg 94 is affixed by mounting bolts 102 near an end of second main section 84. Second stationary leg 94 includes an inboard contact surface 98 and an outboard contact surface 96. Both such contact surfaces are usually comprised of hardened steel and are affixed usually by screwing or bolting into the appropriate inboard and outboard edges of second stationary leg 94. Further, spacing bar 100 is affixed to the rear of second stationary leg 94. Spacing bar 100 is usually comprised of hardened steel and is about 5 inches long and about 1 inch in height and width. Inboard contact surface 98 and outboard contact surface 96 are also about 6 inches long and about 1 inch in width and height.

Referring now to FIG. 7, a detail of prior art wheelbase gauge 80 is shown wherein an indicating scale 112 is shown as scribed lines about 0.075 inches apart, on a top surface of second main section 84. Indicator mark 114 and indicator mark 116 are shown as registering lines scribed on the top surface of first main section 82. When wheelbase gauge 80 is utilized to measure the wheelbase between pedestal jaws of a railway truck sideframe, first main section 82 is pulled such that outboard contact surface 106 engage an outboard edge of the pedestal jaw and second main section 84 is pushed such that inboard contact surfaces 98 engage an inboard edge of the opposite pedestal jaw of the sideframe being measured. Referencing the appropriate nominal indicator mark 114 or 116 as determined by the nominal wheelbase of the sideframe, the wheelbase is gauged by reading the position of the appropriate indicator mark, shown as 114 in FIG. 7, on indicating scale 112. If indicator mark 114 was located in this central or 3 section of indicating scale 112, the wheelbase would be normal without a plus or minus tolerance. However, if indicator mark 114 were in section 1, it would indicate a reduced wheelbase of two 0.075 inch increments. Similarly, if indicator mark 114 were in section 5 of indicating scale 112, it would indicate an increased wheelbase of two 0.075 inch increments from normal for the indicated sideframe. Such gauging of the sideframe would be permanently indicated on the sideframe by removal of a certain amount of raised buttons on the sideframe above the pedestal jaw.

Similarly, an additional measurement of the wheelbase between pedestal jaws of a sideframe is taken by utilizing prior art wheelbase gauge 80. Such second measurement requires the operator at first main section handle 86 to push first main section 82 inwardly such that first inboard contact surface 104 of first stationary leg 101 contacts an inboard edge of the pedestal jaw of the sideframe being measured. Similarly, the operator at second main section handle 88 pulls second main section 84 such that second stationary leg outboard contact surface 96 is in contact with an edge of the opposite pedestal jaw outboard edge. A similar reading is made as described above utilizing indicating scale 112 and indicator mark 114 or indicator mark 116 as may be appropriate with the nominal wheelbase. Once the two readings are made, they are averaged and an appropriate indication is made on the casting. If 3 buttons were left, it would indicate a 3 reading, or normal. If 5 buttons were left, it would indicate an increased wheelbase of two more than three, or an increased wheelbase of two times 0.075 inches.

Figure 9:
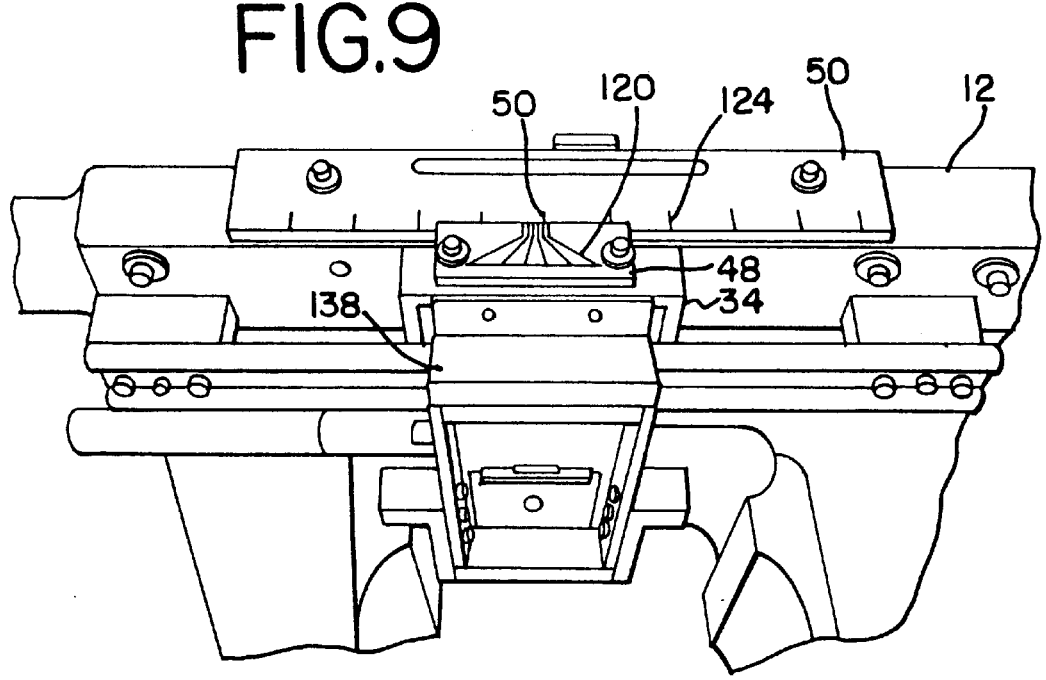
FIG. 9 is a detailed partial view of the measuring scale on the measuring leg in relation to the standard markings for sideframe wheelbases on a wheelbase gauge in accordance with the present invention.

Referring now to FIGS. 8 and 9, the application of the present invention wheelbase gauge 10 to sideframe 128 is shown. Sideframe 128 is seen to comprise a pedestal jaw outboard edge 130 and a pedestal jaw inboard edge 132 with a roof 134 forming the entire pedestal jaw opening adapted to receive a roller bearing and an end of an axle in the ultimate assembly of a railway freight car truck. Measuring leg 34 is seen to be positioned between sideframe pedestal jaw outboard bearing support 136 and sideframe pedestal jaw inboard bearing support 138. These are raised sections extending inwardly within the pedestal jaw to precisely fit the bearing axle end. Measuring leg outboard contact surface 42 is seen to be in contact with sideframe pedestal jaw outboard bearing support 36. Such contact is readily accomplished by gently pulling on handle 52 of measuring leg 34 thereby sliding measuring leg 34 along bearing slide assembly 36 to readily place measuring leg outboard contact surface into contact with sideframe pedestal jaw outboard bearing support 36. At the same time, not shown in FIGS. 8 and 9, stationary leg end 14 would be in contact with an inboard edge of the pedestal jaw opening at the end of sideframe 128. Such contact would be with a sideframe pedestal jaw inboard bearing support for that pedestal jaw opening. A reading is taken on the scale as best shown in FIG. 9 by comparing indicator scale 48 with the nominal indicator mark 50 for the wheelbase of the particular sideframe being measured. When appropriate contact is made using measuring leg 34 and stationary leg 22, a reading is taken using expanded portion 120 of indicator scale 48. As seen in FIG. 9, such expanded portion makes it easier to read the position of indicator mark 50 in indicating scale 48. For example, if measuring leg 34 is drawn to the outer most acceptable limit where indicator mark 50 would be positioned opposite scale section 5, this would indicate that two increments of 0.075 inches were present beyond the normal wheelbase for the particular sideframe being measured.

Figure 10:
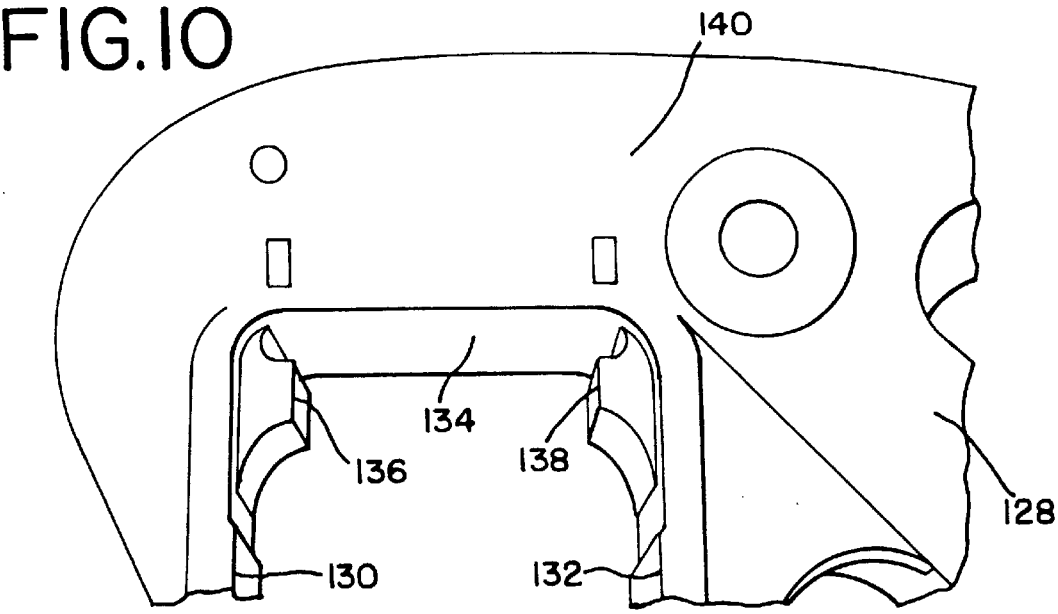
FIG. 10 is a partial view of a sideframe pedestal jaw area showing the permanent indications of the wheelbase.

A second reading is always taken whereby stationary leg 22 would be moved by moving the entire main horizontal body section 12 such that inboard contact surface 24 of wheelbase gauge 10 would be brought into contact with the outboard pedestal jaw edge. Measuring leg 34 would be gently slid into position against inboard bearing support 38 edge of sideframe pedestal jaw as shown in FIG. 8. A reading would be taken in a manner similar to that described above and the two would be averaged to indicate the proper wheelbase for the sideframe. As noted in FIG. 10, the button indicator system is utilized whereby such a measurement would indicate that the five buttons would be left in a raised position above the pedestal jaw opening for the particular measurement shown in FIG. 9. The button indication in FIG. 10 reflects such measurement of two increments over the normal reading of three.

Figure 11:
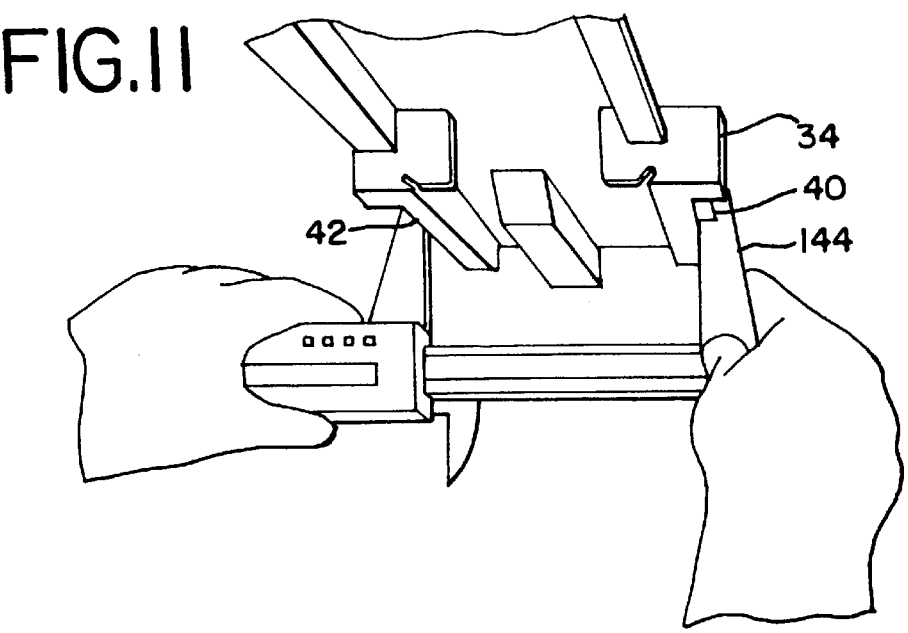
FIG. 11 is a partial view of the measuring leg of the wheelbase sideframe gauge of the present invention being itself measured for tolerance.
Figure 12:
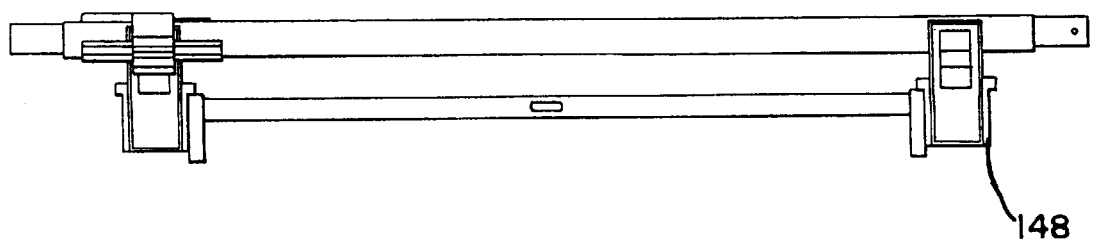
FIG. 12 is a side view of the wheelbase sideframe gauge of the present invention itself being positioned on a master gauge for tolerance.

Referring now to FIG. 11, it is necessary to measure the wheelbase gauge itself from time to time, usually daily. Such a measurement is indicated in FIG. 11 as being performed by use of caliper 144 to indicate that the space between measuring leg contact surfaces 40 and 42 is in tolerance. Further, as shown in FIG. 12, it is also desirable to place wheelbase gauge 10 itself on master gauge 148 which is kept in a gauging room and is not subject to a manufacturing environment. Wheelbase gauge 10 itself is set to see that its normal dimension as indicated by the position of indicator mark 50 on indicator scale 48 is within the acceptable range for the normal dimension indicated by the master gauge 148. If necessary, stationary leg 22 can be loosened by loosening stationary leg mounting bolts 30 to reposition stationary leg 22 while measuring leg 34 is held in a zero tolerance situation as indicated by the position of indicator mark 50 opposite indicator scale 48.

What is claimed is:

1. A gauge for measuring the wheelbase of a railway truck sideframe comprising a main horizontal body section,
   a stationary leg depending from and affixed to said main horizontal body section near a first end thereof,
   a bearing slide assembly rigidly affixed to, horizontally aligned with and laterally spaced from said main horizontal body section near a second end thereof,
   a measuring leg depending from said bearing slide assembly, said measuring leg being moveable in a horizontal direction across said bearing slide assembly,
   and an indicator scale associated with said measuring leg to measure a wheelbase of a railway truck sideframe.

2. The gauge of claim 1
   wherein said main horizontal body section is comprised of a single piece of aluminum having handles formed at either end.

3. The gauge of claim 1
   wherein said stationary leg includes two hardened steel contact pads each affixed to a horizontal edge of said stationary leg and a hardened steel spacer pad affixed to a back section of said stationary leg.

4. The gauge of claim 3
   wherein the horizontal distance between said hardened steel contact pads on said stationary leg and an indicator mark on said main horizontal body section is kept within a tolerance of 0.005 inch.

5. The gauge of claim 1
   wherein said indicating scale is affixed to said measuring leg, and an indicator mark is placed on said main horizontal body section such that upon movement of said measuring leg on said bearing slide assembly, a measurement can be made of the distance between said stationary leg and said measuring leg by viewing an indicator mark on said main horizontal body section in relation to the indicating scale on said measuring leg.

6. The gauge of claim 5
   wherein said indicating scale comprises a series of marked, measured increments of linear horizontal distance, with such increments expanded on said indicating scale to allow a more ready indication of position of said indicator mark in relation to said indicating scale.

7. The gauge of claim 1
   wherein said measuring leg includes two hardened steel contact pads each affixed to a horizontal edge of said measuring leg and a hardened steel spacer pad affixed to a back section of said measuring leg.

8. The gauge of claim 1
   further comprising a protruding handle on said measuring leg, said protruding handle facing toward said second end of said main horizontal body section.

9. The gauge of claim 1
   wherein said stationary leg is adjustably affixed to said main horizontal body to allow adjustment to a master tolerance gauge.

10. A method of measuring the wheelbase of a railway truck sideframe comprising the steps of
    placing a gauge comprising a main horizontal body section onto a railway truck sideframe,
    placing an edge of a stationary leg depending from said main horizontal body section to contact an outboard edge of a pedestal jaw of a railway truck sideframe,
    moving a measuring leg along a bearing slide assembly horizontally aligned with, rigidly affixed to and laterally spaced from said main horizontal body section to contact an inboard edge of an opposite pedestal jaw of said railway truck sideframe,
    and comparing the horizontal position of said measuring leg by utilizing an indicating scale mounted on said gauge to determine the wheelbase of said railway truck sideframe.

11. The method of claim 10 further comprising the steps of
    moving said stationary leg to contact an inboard edge of a pedestal jaw of said railway truck sideframe,
    moving said measuring leg along said bearing slide assembly to contact an outboard edge of an opposite pedestal jaw of said railway truck sideframe,
    and comparing the horizontal position of said measuring leg by utilizing an indicating scale mounted on said gauge to determine a second measurement of the wheelbase of said railway truck sideframe.

12. The method of claim 11
    further comprising the step of averaging said two measurements of the wheelbase of said railway truck sideframe.

13. The method of claim 10
    wherein said indicating scale is affixed to said measuring leg and an indicator mark is affixed to said main horizontal body section of said gauge, wherein a horizontal position of said indicating scale is compared to said indicator mark to determine a wheelbase of said railway truck sideframe.

14. The method of claim 10
    wherein said edge of said stationary leg includes a hardened steel contact pad contoured to contact an edge of said pedestal jaw.

15. The method of claim 10
    wherein said edge of said measuring leg includes a hardened steel contact pad contoured to contact an edge of said pedestal jaw.

16. The method of claim 10
    wherein said stationary leg is adjustably affixed to said main horizontal body to allow adjustment in the position of said stationary leg to a master tolerance gauge.

* * * * *